(No Model.)
R. T. SCOWDEN.
APPARATUS FOR PURIFYING WATER.
No. 513,536. Patented Jan. 30, 1894.
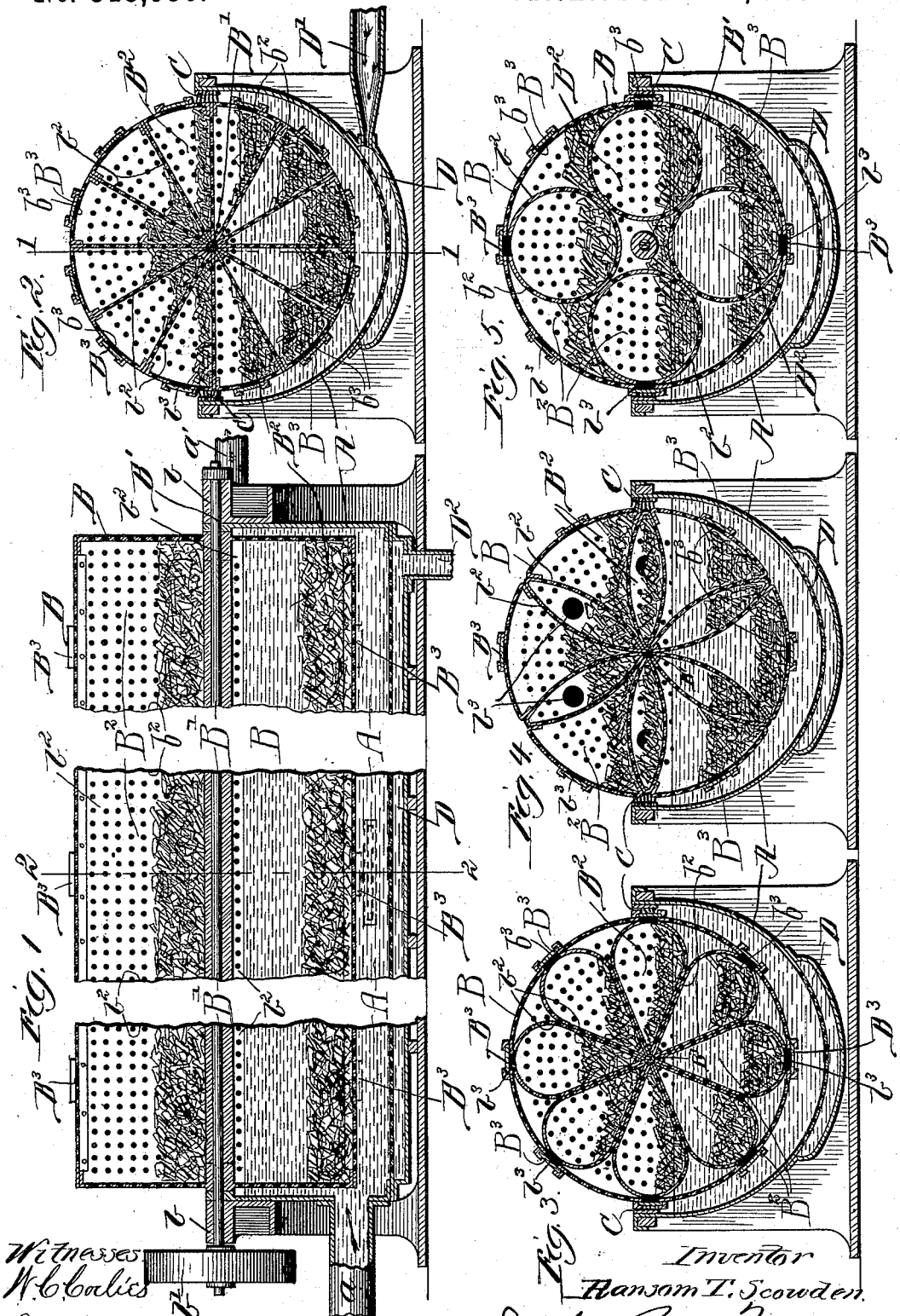
Witnesses
W. C. Oaks
Fred'k N. Mills
Inventor
Ransom T. Scowden
By Dayton Poole & Brown
his Attys
THE NATIONAL LITHOGRAPHING COMPANY,
WASHINGTON, D. C.

UNITED STATES PATENT OFFICE.

RANSOM T. SCOWDEN, OF CHICAGO, ILLINOIS.

APPARATUS FOR PURIFYING WATER.

SPECIFICATION forming part of Letters Patent No. 513,536, dated January 30, 1894.

Application filed October 2, 1891. Serial No. 407,544. (No model.)

*To all whom it may concern:*

Be it known that I, RANSOM T. SCOWDEN, of Chicago, in the county of Cook and State of Illinois, have invented certain new and useful Improvements in Processes of and Apparatus for Purifying Water; and I do hereby declare that the following is a full, clear, and exact description thereof, reference being had to the accompanying drawings, and to the letters of reference marked thereon, which form a part of this specification.

My invention relates to apparatus for purifying water, and more particularly to that process and apparatus in connection with which so-called "spongy" iron, or iron scrap, turnings, borings or filings are used, an apparatus of this class being set forth in Letters Patent of the United States No. 322,148, granted July 14, 1885, to William Anderson, upon which apparatus my present invention may be regarded as an improvement.

The principal object of my invention is to increase the rapidity and extent of the oxidation and solution of the iron, so that larger quantities of water may be purified in a given time in an apparatus of given dimensions.

A further object of my invention is to improve the mechanical structure of the apparatus so as to avoid certain disadvantages attendant upon the structure heretofore used.

To these and other ends my invention consists in the matters hereinafter described and pointed out in the appended claims.

In the process of purifying water by means of scrap iron as heretofore practiced, commonly known as the "Anderson" process, the iron is inclosed in a cylinder having inlet and outlet apertures in its trunnions and closed to the outer air, the iron being lifted in successive bodies or masses by means of the interior shelves of the cylinder and is showered down through the water in the cylinder, through which it descends by gravity. As each shelf rises the iron thereon begins to fall and continues to fall until the shelf has reached its highest point, whereupon the shelf becomes substantially vertical, the remainder of the iron falls, and during the remainder of the travel of the shelf there is no fall of iron. During its passage through the water there is little or no attrition of the particles of iron, and since such attrition aids the solution of the iron, the effectiveness of the operation is thus diminished to an extent proportional to that part of the cycle of movement of the iron during which little or no attrition occurs. In order to obviate these disadvantages, I propose to carry the iron positively through the water while in contact with metallic surfaces, so that all portions of the water are equally exposed to the action of the iron while at the same time the iron is constantly in moving frictional contact with such metallic surfaces, so that attrition is constantly going on, thereby greatly facilitating the solution of the iron, and, consequently, the formation of ferrous carbonate and, subsequently, of ferric oxide. Moreover, as has already been noted, closed cylinders have heretofere been used, excluding the air, which, being necessary to facilitate the purifying process, has been forced in by pumping, a comparatively inconvenient and costly method, while the vitiated air accumulates in the upper portion of the cylinder, whence it is difficult of removal and by its pressure frequently detrimental. These disadvantages I obviate by positively carrying the iron alternately through the water and through the air, both the water and iron being freely exposed to the air during this operation and not inclosed so that in the first place the iron will carry with it into the water sufficient air to effect the desired aeration, while the vitiated air may pass off freely without being retained to contaminate the purified water.

It will thus be seen that by my improved process all portions of the water are fully exposed to the action of the iron, which latter is undergoing attrition at all times, thereby increasing the amount of iron dissolved, while the necessary aeration is accomplished in a simple, cheap and effective manner and a free discharge for the vitiated air provided.

In the accompanying drawings I have shown, in several modified forms, one kind of apparatus which I have devised for carrying out my improved process.

In the said drawings: Figure 1 is a central longitudinal sectional view of such an apparatus, taken on the line 1—1 of Fig. 2. Fig. 2 is a transverse sectional view, taken on the line 2—2 of Fig. 1. Fig. 3 is a view similar to Fig. 2, illustrating a modification. Fig. 4 is a similar view, illustrating another modification. Fig. 5 is a similar view illustrating yet another modification.

In the drawings, A represents an open conduit through which the water passes, the same being shown in the present instance in the form of a semicylindrical trough, having an inlet, $a$, at one end near its bottom, and an outlet, $a'$, at its other end near its top.

B is a hollow perforated cylinder mounted to revolve in the trough A, the two parts being so arranged and proportioned that the cylinder extends above the trough, or above the water line thereof, about one-half, more or less, of its diameter. I prefer to secure the cylinder B on a shaft, $B'$, mounted in bearings, $b$, on the end of the trough A, said shaft being provided with a pulley, $b'$, or other device by means of which a rotary movement may be imparted to the said shaft and cylinder.

The cylinder B is divided into a plurality of compartments or chambers, $B^2$, formed by partition walls, $b^2$, said chambers extending longitudinally of the cylinder, the partition walls being parallel with the axis of rotation thereof, and being apertured or perforated, as is the cylinder B, as already stated. In Figs. 1 and 2 of the drawings I have shown these partitions as radial planes, but I do not limit myself to this particular form, and in Figs. 3, 4 and 5 I have shown other forms which I have devised. In Fig. 3, the partitions are radial for a portion of their length, and are united in pairs at their outer ends by semicylindrical portions. In Fig. 4 the partitions are reversely curved so as to meet in pairs at both their inner and outer edges, while in Fig. 5 they are cylindrical in form, forming a group of cylinders in contact with each other and with the cylinder B. In the first construction the compartments or chambers $B^2$ are each formed by two of the partitions in conjunction with a part of the main cylinder, while in the remaining forms only a portion of the chambers are so formed, the remainder being inclosed solely by the partitions. Suitable filling apertures, $b^3$, provided with closures, $B^3$, of any suitable form, are provided to give access to the interior of each chamber $B^2$ for the insertion and removal of the iron.

Metallic brushes, C, mounted on the lateral margins of the trough, bear upon the outer surface of the cylinder B and keep the same clean, these brushes being omitted where the closures $B^3$ occur, in case these latter project, as in the construction shown.

In the operation of this apparatus, the water enters the trough at the inlet $a$ and passes off through the outlet $a'$, it not being inclosed or under pressure during its passage through the machine, but being freely exposed to the outer air. The cylinder B being revolved by any suitable means, the iron therein is carried positively through the water by means of the partitions which inclose it, said partitions and the wall of the cylinder B forming metallic contact surfaces with which the iron is always in frictional contact, rolling successively over all of these surfaces and thus securing continuous attrition of the particles. The cylinder revolves half in the air and half in the water, each compartment carrying its contents alternately through the former and the latter. Sufficient air is carried down into the water along with the iron and its inclosing chambers to furnish all the aeration needed except in extraordinary cases; while the vitiated air is free to escape, being in no way inclosed or retained. The metallic surfaces and the inclosed scrap iron being always kept bright, the best results are obtained in the formation of ferrous carbonate, and, subsequently, of ferric oxide.

Although the air introduced into the water by means of the revolving cylinder will be sufficient for proper aeration under almost all circumstances, I make provision, in case it be found necessary, for further aeration, by means of an air-chamber, D, under the bottom of the trough A, which, in this case is perforated as shown. A nozzle, $D'$, introduces air under pressure from any suitable source into the chamber D whence it passes through the perforated trough-bottom into the water within the trough. This portion of the apparatus may be and usually will be omitted.

$D^2$ is a drain or waste pipe.

Although I have shown the cylinder as arranged with its axis in the line of flow of the water, it is obvious that its axis may be arranged transversely thereto, in which case the cylinder may be provided with buckets by means of which it will be revolved through the medium of the water undergoing purification. A series of such cylinders may also be used if desired. It will be understood, of course, that the perforations in the heads and walls of the cylinder and of the compartments thereof will be of such size as to prevent the escape of the particles of iron.

The chemical action is due to the formation of ferrous carbonate through the action of the carbonic acid and oxygen of the air upon the iron particles, the same being assisted by the attrition of such particles. This ferrous carbonate is, through aeration, converted by oxidation into the insoluble ferric hydroxide, which carries down the organic matter and subsequently oxidizes and destroys it.

The chief advantages of my improved apparatus are, among others: first, simplification of the apparatus, the water being introduced and discharged through pipes free from working joints, packing or stuffing boxes; second, positive, uniform and constant between the iron and water; third, simplified and continuous aeration by carrying atmospheric air through the water in conjunction with the iron; fourth, more thorough agitation of the water and increased solution of the iron through constant attrition between the particles of the iron themselves, and between said particles and the iron surfaces which propel the iron through the water, thereby deriving the full effect of the carbonic acid contained in the water and air to dissolve the iron and form the soluble ferrous carbonate, and, fifth, the water issues from the purifying apparatus more highly charged with ferrous carbonate, which is more readily and completely transformed into the insoluble ferric hydroxide by thorough aeration in the purifying apparatus, and, consequently, effects improved coagulation and precipitation, and therefore accomplishes improved clarification and purification, rendering subsequent filtration easier, more effective and cheaper.

What I claim is—

1. In a water-purifying apparatus, a revolving perforated purifying cylinder provided with a plurality of compartments or chambers containing particles of iron of the character described, and each compartment having perforated walls parallel with the axis of rotation of the cylinder, substantially as described.

2. In an apparatus for purifying water, a water vat a perforated cylinder mounted to rotate partly in the water and partly in the atmospheric air, and provided with a plurality of longitudinal compartments or chambers containing particles of iron of the character described and having perforated walls parallel with the axis of rotation of the cylinder, substantially as described.

3. In a water-purifying apparatus, a purifying cylinder provided with perforated radial partition plates forming longitudinal compartments, said compartments containing particles of iron substantially as described.

4. An apparatus for purifying water comprising an open trough having inlet and outlet passages for the water, a perforated cylinder mounted to revolve in said trough partly in water and partly in the atmospheric air, and provided with longitudinal compartments containing particles of iron of the character described.

5. In a water-purifying apparatus, a perforated revolving cylinder containing iron particles, in combination with a trough embracing the lower portion of the cylinder, having metallic brushes to bear on the outer surface thereof, and provided with a water inlet and outlet, substantially as described.

6. In a water-purifying apparatus, the combination, with a perforated purifying cylinder, of a trough inclosing the lower portion thereof and provided with a water inlet and outlet, and a perforated bottom, an air chamber under said perforated bottom, and means for introducing air under pressure into said chamber.

In testimony that I claim the foregoing as my invention I affix my signature in presence of two witnesses.

RANSOM T. SCOWDEN.

Witnesses:
IRVINE MILLER,
C. A. NEALE.